No. 873,658. PATENTED DEC. 10, 1907.
H. S. BLOOD.
STOVEPIPE JOINT.
APPLICATION FILED JAN. 24, 1907.
Fig. 1.
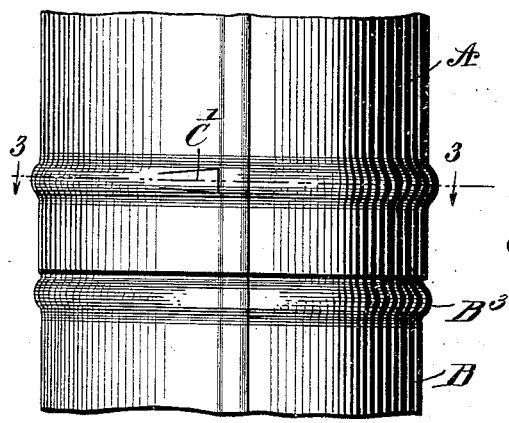
Fig. 2.
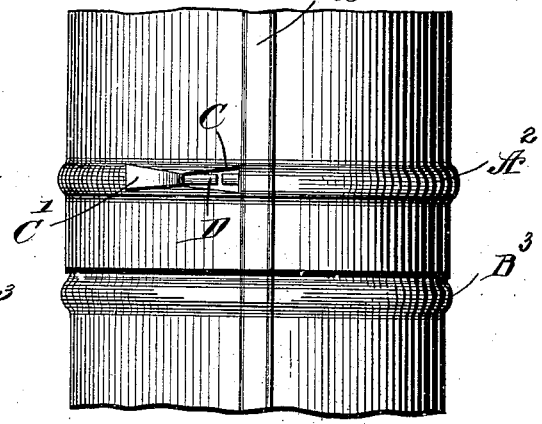
Fig. 3.
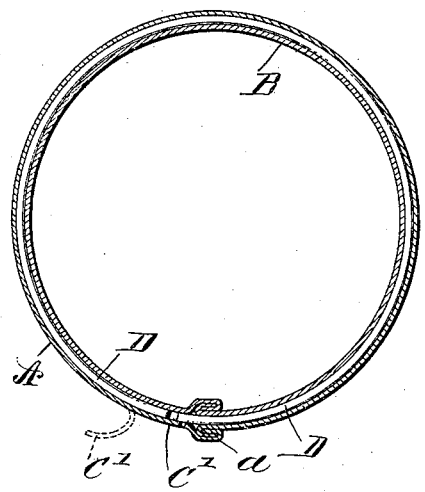
Fig. 4.
Fig. 5.
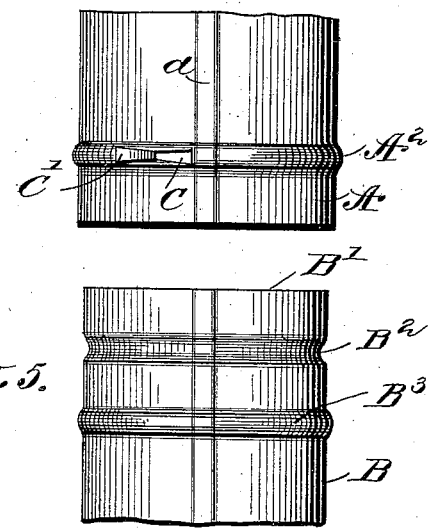
WITNESSES
Samuel E. Wade
Percy B. Turpin
INVENTOR
HENRY S. BLOOD.
BY Munn & Co.
ATTORNEYS

UNITED STATES PATENT OFFICE.

HENRY S. BLOOD, OF BOTTINEAU, NORTH DAKOTA.

STOVEPIPE-JOINT.

No. 873,658.     Specification of Letters Patent.     Patented Dec. 10, 1907.

Application filed January 24, 1907. Serial No. 353,806.

*To all whom it may concern:*

Be it known that I, HENRY S. BLOOD, a citizen of the United States, and a resident of Bottineau, in the county of Bottineau and State of North Dakota, have invented certain new and useful Improvements in Stovepipe-Joints, of which the following is a specification.

My invention is an improvement in joints for stove pipes and other pipes, and particularly in the means for connecting the adjoining sections thereof; and the invention consists in certain novel constructions and combinations of parts as will be hereinafter described and claimed.

In the drawing Figure 1 is a side view of a stove pipe joint embodying my invention, the flap being closed. Fig. 2 is a similar view the flap being open to expose the ends of the fastening key. Fig. 3 is a cross-section on about line 3—3 of Fig. 1, the flap being closed in full lines and indicated in dotted lines as open. Figs. 4 and 5 are side views illustrating the meeting ends of the pipe sections detached.

In carrying out the invention I construct the meeting ends of the pipe sections A and B to fit one over the other, that is to say, the pipe A fits at one end over the meeting end of the pipe B so that for convenience of reference I may refer to these ends as the outer and inner sections. Manifestly, in practice the pipes may be made at one end to fit over a meeting section and at the other end to fit in the next meeting section, so the pipe sections may be interchangeably used, as desired. The section B is provided a short distance from its end B′ with an annular groove $A^2$ in its outer face and a short distance back of such groove $A^2$ with an annular bead $B^3$ forming a stop for the section A when the parts are telescoped as shown in Fig. 1. The section A fits at its end over the meeting end of the section B and abuts at its extremity the bead $B^3$ and is provided in its inner face with an annular groove $A^2$ which registers with the groove $B^2$ in the section B. By preference the grooves $A^2$ and $B^2$ are secured by beading the pipe circumferentially which may be effected by the tools usually used for such purpose by tinsmiths.

The bead $A^2$ is provided adjacent to the seam *a* with an opening C and with a flap C′ which may be set as shown in Fig. 1 to close the opening C or may be opened as shown in Fig. 2 and indicated in dotted lines Fig. 3 to uncover the opening C and expose the ends of a key D which is fitted within the annular channel afforded jointly by the grooves $A^2$ and $B^3$. This key D may be inserted through the opening C when the sections A and B are arranged as shown in Figs. 1 and 2 and when inserted at one end in the opening C and forced around through the channel it will finally be adjusted until its ends are arranged adjacent to each other and opposite the opening C so access may be had thereto by a pair of pliers for the purpose of removing the key when it is desired to separate the pipe sections.

It will be noticed that the channel formed by the beads $A^2$ and $B^2$ is continuous and that the key D is of a length approximately equal to the circumference of the pipe sections so that I am able to avoid the use of any stop projections on the key to limit the extent to which it may be forced into the channel, and there is at all times the end or some portion of the key opposite the opening C so it may be reached by a pair of pliers for manipulating the key when placed in the channel in case it should be desired to remove the key for separating the pipe sections. When the key has been introduced the flap C′ may be pressed back from the position shown in Fig. 2 to that shown in Fig. 1 in which it will cover the opening C in order to avoid any unusual appearance in the stove pipe. It will be noticed that the key forms a connection between the pipe sections throughout their circumference and by thus securing the continuous locking or connection between the parts, avoids any danger of disconnection or breakage of the pipe sections because of unusual strain in any direction.

While the invention is especially designed for use on stove pipes it manifestly may be employed on other pipes without departing from the broad principles of my invention.

The key is preferably a length of suitable wire of brass, copper or the like not easily corroded.

What I claim is—

1. The improvement in pipe joints herein described comprising the outer section and the inner section fitted at one end within the adjacent end of the outer section, said inner section having a bead forming an abutment and stop for the end of the outer section and the telescoped portion of the inner and outer sections being provided with annular beads that on the inner section forming an annular groove in its outer side and that on the outer section forming an annular groove on its inner side registering with the annular groove on the inner section, and the outer bead having an opening and a flap for closing the same, and a key introduced through said opening and made of a length approximately equal to the circumference of the pipe sections whereby the said key may encircle the inner pipe section within the channel formed by the grooves therein and in the outer section and have both its ends arranged opposite the opening in the outer bead, substantially as and for the purposes set forth.

2. A pipe joint composed of sections telescoped at their meeting ends and provided in their telescoped portions with coinciding grooves, that in the inner section being in its outer face and that of the outer section in its inner face and extending uninterruptedly around the joint whereby the said grooves combine to form a continuous channel around the inner pipe section, an opening being provided leading into the outer groove and a flap for closing said opening, substantially as set forth.

3. A pipe joint comprising the telescoping sections, the inner one having in its outer face an annular groove and the outer one having in its inner face an annular groove coinciding with that in the inner section, an opening being provided leading to the groove in the outer section and a key within the channel formed by the said groove and extending entirely around the inner section and having its opposite ends arranged in close proximity opposite the opening leading to the channel, substantially as and for the purposes set forth.

HENRY S. BLOOD.

Witnesses:
SOLON C. KEMON,
PERRY B. TURPIN.